United States Patent Office 3,262,960
Patented July 26, 1966

3,262,960
METHOD OF PRODUCING ORGANIC ISOCYANATES
Erwin S. Gutsell, Jr., Muskegon, Mich., assignor to The Ott Chemical Company, Muskegon, Mich., a corporation of Delaware
No Drawing. Filed Oct. 19, 1962, Ser. No. 231,843
15 Claims. (Cl. 260—453)

This invention relates to a process for the preparation of aromatic isocyanates and more particularly to the preparation of aromatic isocyanates, including mono, di, and poly isocyanates, from the corresponding aromatic amines in the presence of an aluminum halide catalyst and a liquid organic solvent.

The well known prior art method for the preparation of aromatic isocyanates is by the reaction of an aromatic amine with a carbonyl halide. The process of this invention utilizes this general reaction.

There are many prior art process variations utilizing the above reacton. The reason for these process variations is that under most process conditions the reaction produces excessive amounts of dimers and/or polymers of the aromatic isocyanate product, thereby reducing the aromatic isocyanate yield. Another problem encountered in these processes is that the reaction of the carbonyl halide with the aromatic amine is very slow. Further, the purity of the product produced in these processes is in most instances not in line with consumer specifications.

A considerable number of liquid phase processes have been developed by the prior art in an attempt to overcome the problems. The two-stage processes are of primary importance. In these processes in the first stage, an initial reaction between the carbonyl halide and the aromatic amine is conducted at between about 0° C. and room temperature in an inert solvent to form the intermediate aromatic amine hydrohalide and aromatic carbonyl halide salts. The second stage involves the reaction of these intermediates in the inert solvent with a further amount of the carbonyl halide at higher temperatures (i.e. 80° to 320° C.) to produce the aromatic isocyanate product. The hydrogen halide gas generated by the reaction is removed in this stage. While these prior art processes have enjoyed some commercial success, they suffer in whole or in part from the aforementioned disadvantages. A particular problem is the high second stage temperatures which increase the formation of dimers and/or polymers. However, these prior art processes do have the advantage of being adaptable to a continuous process and thus are presently being used to produce aromatic isocyanates.

A further problem encountered with these two-stage processes occurs in the second stage. The intermediates formed due to treatment of the aromatic amines with a carbonyl halide (i.e. the aromatic amine hydrohalides and the aromatic amine carbonyl halides) are virtually insoluble in the inert solvent, and thus a thick slurry is formed. A considerable problem with the second stage of the two-stage process is in effectively treating the intermediates.

A variation of the two-stage process is the one-stage process wherein the hydrohalide salt of the aromatic amine in an inert solvent is treated with a carbonyl halide at an elevated temperature of 80° to 200° C., to convert it to the aromatic isocyanate. Since the amine hydrohalide intermediate is produced in the first stage of the two-stage process to a limited extent, this process is very similar to the second stage of the two-stage process. The problems with this one-stage process are the same as those found in the two-stage process, except the aromatic amine hydrohalide solvent mixture is a workable mass.

It can thus be seen that there is a need for one- and two-stage processes which provide aromatic isocyanates in improved yield and purity.

It is therefore an object of this invention to provide one and two-stage processes for the production of aromatic isocyanates in high yield and purity, using single or multiple reaction vessels, in a batch or continuous process.

It is further an object of this invention to provide processes which materially reduce the amount of side reaction dimer and/or polymer production.

It is further an object of this invention to provide processes which are adapted to the rapid production of aromatic isocyanates.

Further still, it is an object of this invention to provide a novel second-stage process step for treating the intermediates.

These and other objects will be come increasingly apparent to those skilled in the art as the description proceeds.

It has been found that aromatic isocyanates can be produced by a two stage process which comprises reacting an aromatic amine with a molar excess of a carbonyl halide in the presence of an aluminum halide catalyst and a liquid organic solvent to produce a reaction product, removing the gaseous acid halide present from the reaction product by heating and in certain instances in the preferred process while simultaneously adding a carbonyl halide to the reaction product and recovering the aromatic isocyanate. Further, it has been found that aromatic isocyanates can be produced by the one-stage process which comprises reacting an aromatic amine hydrohalide with an excess of a carbonyl halide in the presence of an aluminum halide catalyst and an organic solvent while removing the gaseous acid halide present and recovering the aromatic isocyanate. In particular, the preferred aluminum halide is aluminum chloride and the preferred liquid organic solvent is ethyl acetate. Further, the preferred carbonyl halide is phosgene.

The preferred processes of this invention are illustrated by the following examples. Example I is a two-stage batch process using two reaction vessels:

Example I

Phosgene 173.5 grams (1.756 moles) was introduced into a flask and maintained at a temperature of between 0–8° C. Aluminum chloride 0.34 g. was added to the phosgene solution. A prepared mixture of toluene diamine 97.5 g. (0.798 mole) (80% toluene-2,4-diamine, 20% toluene-2,6-diamine) and 550 ml. of ethyl acetate was brought to a temperature of 45–50° C. The prepared solution of toluene diamine was then added to the phosgene solution over a period of one hour with agitation while maintaining the temperature at between 0–8° C. This completed the first stage of the process.

After the introduction of the toluene diamine was complete, the reaction product was transferred, over a period of forty minutes to a second flask containing a small amount of ethyl acetate (50 ml.). The contents of the second flask were stirred and maintained at 60–65° C., during the transfer. The contents were heated and phosgene (142.0 g.) (1.438 moles) was introduced for three hours until all solid particles were dissolved. Hydrochloric acid was evolved and vented during the phosgenation. The temperature was gradually raised from 65° to 76° C. during this stage. After the phosgenation was completed, the reaction product was heated to a temperature of 80° C. to remove any remaining hydrochloric acid gas.

After the degassing was complete, the ethyl acetate was distilled from the reaction product until the temperature of the reaction product reached 110° C. Ethyl acetate (550 ml.) was removed in this step. A vacuum distillation was then conducted to remove the final amounts of ethyl acetate at 97° C. and 1.5 mm. of mercury. Thirty milliliters (30 ml.) of ethyl acetate were recovered.

Finally the toluene diisocyanate was recovered from the reaction product by vacuum distillation at 5 mm. of mercury and 92–93° C. The yield was 123.8 g. (89% of theory) of high purity, clear toluene diisocyanate which assayed 99.9% toluene diisocyanate, had a chloride content of 0.002% and which had a freezing point of 12–13° C. The toluene diisocyanate reaction product was a mixture of 80% toluene-2,3-diisocyanate and 20% toluene-2,6-diisocyanate.

Further runs of the same type were conducted using a single reaction vessel instead of the two reaction vessel system of Example I. The results using a single reaction vessel batch process were identical with those of Example I.

The batch process of Example I was modified to a continuous process as shown by the following Example II:

Example II

The equipment for the continuous run was a series of flasks connected by dip tubes for removing the reaction product from the previous flask. The reactants were introduced into a first flask with stirring and were maintained at a temperature of 0° C. The liquid phosgene and toluene diamine-ethyl acetate mixture was combined in this flask with agitation and allowed to react for a period of one hour. This part of the process was equivalent to the first stage of Example I.

After initial reaction, a portion of the reaction product from this first flask was transferred to a second flask with stirring by means of nitrogen pressure. The second flask was provided with a means of agitation and a source of supply of phosgene and was maintained at a temperature of between 65–70° C. The phosgene flow rate in this flask was adjusted to a rate of five (5) grams per hour. Hydrochloric acid was given off in this flask and vented to a collector.

The reaction product of the second flask was transferred in part into a third flask with stirring. The third flask was maintained at a temperature of between 70–79° C. and phosgene was added at a flow rate of fifty-five (55) grams per hour. Hydrochloric acid was given off and vented to a collector.

The product was then transferred to a fourth flask where the final degassing of hydrochloric acid gas was conducted at a temperature of between 79–80° C. This part of the process was equivalent to the second stage of Example I. The reaction product in this flask was then transferred to a fifth flask where the ethyl acetate was removed by distillation at a temperature of 110° C.

Initially the flow between the first and second flask was at a rate of 350 ml. per hour and the flow from the second to the third flask was at a rate of 350 ml. per hour. In start up, a two hour hold up was maintained at this point and then the flow from the third flask to the fourth flask was 350 ml. per two and one-half hours (140 ml. per hour). After the process had started up the flow rate was maintained at a rate of 140 ml. per hour in all flasks. The initial weight ratio of phosgene to toluene diamine was maintained at 1.78.

The toluene diisocyanate was then distilled from the reaction mixture at 5 mm. of mercury and 92–93° C. The toluene diisocyanate from this continuous process was produced in 85% yield with a purity of about 99.8% and a chloride content of 0.0001%. The process and operation produced twenty (20) grams per hour of product.

The process of this invention was conducted using other catalysts. Illustrative are the results obtained using boron trifluoride in the production of toluene diisocyanate in comparative Example III:

Comparative Example III

Phosgene 106.4 g. (1.077 moles) was introduced into a flask at, and maintained at, 0° C. A boron trifluoride-ether complex (10 ml.) was introduced into the flask. A mixture of toluene-2,4-diamine 57.7 g. (0.472 mole) and 600 ml. of ethyl acetate were introduced into the phosgene while maintaining the temperature at 0° C. over a period of one hour. This completed the first stage.

After the introduction of the toluene-2,4-diamine was complete, the reaction product in the flask was heated to a temperature of about 70° C. while introducing additional phosgene 90 g. (0.91 mole) over a period of one hour and thirty minutes. Hydrochloric acid gas was evolved.

After the introduction of the additional phosgene was complete, the mixture was heated to 80° C. for a period of two hours to remove any hydrochloric acid remaining in the reaction product. This completed the second stage.

The ethyl acetate was then distilled from the reaction mixture as in the previous examples. After removal of the ethyl acetate the product was distilled from the reaction mixture at a temperature of 102° C. at 3.5 mm. of mercury. The yield was 74.0 g. (0.425 mole) of toluene-2,4-diamine and the yield was 90%. However, the product exhibited an undesirable dark color and had a high halide content. It did not meet current consumer specifications.

The reaction of Example III was repeated substituting aluminum chloride for the boron trifluoride-ether complex as the catalyst. The color of the product was excellent, the chloride content was greatly reduced, and the product met specifications.

Illustrative of the effectiveness of the one-stage process of this invention is the following Example IV:

Example IV

Toluene diamine hydrochloride 126.59 g. (0.798 mole, 80% 2,4-isomer and 20% 2,6-isomer) was mixed with 550 ml. of ethyl acetate in a flask at a temperature of 60–65° C. Aluminum chloride 0.34 g. was added. Gaseous phosgene 142.0 g. (1.438 moles) was introduced over a period of three hours. The degassing of hydrochloric acid gas was conducted during the phosgenation. The solution was then heated to 80° to remove any remaining hydrochloric acid. This was equivalent to the second stage of Example I.

After the degassing was complete, the ethyl acetate was distilled from the reaction product until the temperature of the reaction product reached 110° C. Ethyl acetate (550 ml.) was removed in this step. A vacuum distillation was then conducted to remove the final amounts of ethyl acetate at 97° C. and 1.5 mm. of mercury. Thirty milliliters (30 ml.) of ethyl acetate were recovered.

Finally the toluene diisocyanate was recovered by vacuum distillation at 5 mm. of mercury and 92–93° C. The yield of the product was 123.1 g. (88.6% of theory) of toluene diisocyanate (80% 2,4 isomer, 20% 2,6 isomer) which assayed 99.9% toluene diisocyanate, had a chloride content of 0.002% and which had a freezing point of 12–13° C.

The foregoing examples illustrate the effectiveness of the one and two-stage processes for the production of toluene diisocyanate using ethyl acetate as a solvent and aluminum chloride as the catalyst.

Table I sets forth the physical data standard of the industry for toluene diisocyanate and the physical data for the toluene diisocyanate produced by the methods of Examples I, II and IV.

TABLE I

| Physical Data | Standard Specifications | Process Product |
| --- | --- | --- |
| Isomer ratio | 20% toluene-2,6-diisocyanate 80% toluene-2,4-diisocyanate. | 20% toluene-2,6-diisocyanate 80% toluene-2,4-diisocyanate. |
| Purity | 99.5% minimum | 99.8–99.9%. |
| Amine Equivalent | 87.5 maximum | 87.4. |
| Color | 25 APHA maximum | 1–5 APHA. |
| Hydrolyzable chloride | 0.01% maximum | 0.001–0.0001%. |
| Total chloride | 0.20% maximum | 0.01%. |
| Crystallizing point | 11.5–13.5° C | 12–13° C. |
| Specific Gravity at 25/15.5° C. | 1.22 approximately | 1.2180 at 24.5° C. |
| Flash point | 270° F. approximately | 265–275° F. |
| Fire point | 295° F. approximately | 290–300° F. |
| Refractive index at 25° C. | 1.566 approximately | 1.566 at 25° C. |
| Boiling point | 250° C. approximately | 250° C. approximately. |
| Total acidity | 0.003 maximum | 0.002. |

An aluminum halide catalyst other than aluminum chloride which was found to be effective was aluminum bromide. Another catalyst, boron trifluoride, was found not to be acceptable in the process of the present invention, since, as shown by Example III, the quality of the aromatic isocyanate product obtained was poor. Aluminum chloride is preferred over the other aluminum halides because of the high purity of the aromatic isocyanate product obtained when it is used.

Ethyl acetate is the preferred solvent. However, other lower alkyl aliphatic esters were used in the process of the present invention and were found to be satisfactory. In general, oxygen containing liquid organic solvents, such as the lower alkyl aliphatic ketones and esters, were found to be suitable. All of the liquid organic solvents used by the prior art can be used.

In particular this includes, for instance, hydrocarbons such as petroleum ether, benzene, cyclohexane, toluene, tetrahydrofuran, cymenes and aromatic ketones; halogenated hydrocarbons such as monochlorobenzene, dichlorobenzene, carbon tetrachloride, tetrachloroethylene and the chlorinated biphenyls; and nitrated hydrocarbons such as nitromethane and the like. However, with the organic solvents other than the oxygen containing liquid organic solvents, much more solvent is required since the intermediate carbonyl chloride is less soluble and does not degas to give the aromatic isocyanate as well. Further, with many of these solvents, the higher temperatures required for their removal from the aromatic isocyanate product result in increased dimerization and/or polymerization products.

The liquid organic solvents containing oxygen are particularly preferred because they appear to enter into the reaction with the result that aromatic isocyanate product is produced in very high yield and purity. Thus, the oxygen containing, liquid organic solvents, e.g. the lower alkyl aliphatic esters and in particular ethyl acetate, are preferred in the process of this invention.

The preferred carbonyl halide is phosgene; however, other carbonyl halides, i.e. carbonyl bromide, may be used. However, phosgene is particularly suitable because of its commercial availability and relatively low cost.

It is preferred to operate the first stage of the process of the present invention at a temperature between about −12° and 15° C. In this operating range, the carbonyl halide, e.g. phosgene, is liquid and thereby contributes to the ease of handling of the materials in the first stage and the purity and yield of the product. However, it has been found that the introduction of the carbonyl halide can be made at higher temperatures but with the result that the yield and purity of the aromatic isocyanate product is reduced. In these cases, the carbonyl halide, phosgene, was introduced as a gas in the first stage.

As illustrated by Examples I and II, it is preferred to introduce the reaction product from the first stage into a heel or amount of the liquid organic solvent over a period of time. This facilitates the handling of the reaction product or slurry obtained from the first stage and results in improved yields and purity of the aromatic isocyanate product.

It has been found that when an aluminum halide is present in the second stage of the process of the present invention or the first stage of the single stage process, that the degassing (i.e. hydrohalide gas) of the reaction product can be conducted between a temperature of about 20 to 80° C., with the range of 60–80° C. being preferred. This results in decreased formation of dimerization and/or polymerization products. Further, with the aluminum halides the purity and yield of the product was materially increased.

In the first stage of the two-stage process between 2.0–2.5 moles of the carbonyl halide per mole of the aromatic amine are preferred. However, any molar excess of the carbonyl halide was found to be operative. In the second stage, a range of 2.0–2.5 moles of the carbonyl halide per mole of the aromatic amine is preferred where an aromatic polyisocyanate is being produced. In this instance as little as 0.5 mole of the carbonyl halide can be used. When a monoisocyanate is being produced, it may be desirable to eliminate the introduction of the carbonyl halide in the second stage and simply relay upon heat to cause the formation of the aromatic monoisocyanate product.

In the one-stage process a molar excess of the carbonyl halide is required and a range of 2.0–2.5 moles of the carbonyl halide per mole of the aromatic amine is preferred. However, any molar excess of the carbonyl halide was found to be suitable.

The conventional means for recovering the aromatic isocyanate from its solvent mixture is to remove the solvent first with atmospheric distillation and then with distillation at reduced pressure. This is the method that was used to recover the aromatic isocyanate product in Examples I–IV. The liquid aromatic isocyanate was then distilled from the reaction product. This is the preferred method of this invention. However, it is contemplated that other means of recovering the aromatic isocyanate product can be used. For instance, various means of solvent-solvent extraction are suitable for extraction of the aromatic isocyanate reaction product after the organic solvent is removed.

In the production of m-phenylene diisocyanate, for instance, hexane has been used to remove this product from its impure mixture. Further, in certain cases the aromatic isocyanate product in the liquid organic solvent can be removed as a solid by filtering after first removing some of the solvent and/or lowering the temperature of the solvent-aromatic isocyanate mixture.

In certain instances the removed liquid organic solvent is reused, particularly in the continuous process. It has been found that the solvent contains a considerable amount of the hydrogen halide dissolved in it. As a result when the aromatic amine is introduced into this solvent, a considerable amount of the aromatic amine hydrohalide salt is formed. In certain instances it may be desirable to go directly to a one-stage process rather than go through the first stage of the two-stage process. However, it will be appreciated that it is preferred to use a two-stage process in this instance.

The terms "aromatic amine" and "aromatic isocyanates" are defined to include those compounds where the amine or isocyanate groups are attached directly to the aromatic nucleus. The terms further include a mono-, di- or poly-substituted aromatic nucleus.

The process is particularly suited to the production of toluene diisocyanate; however, the process has general applicability to production of aromatic isocyanates. In particular, the following compounds, for example, can be produced: diphenyl methane-4,4'-diisocyanate and polymers thereof, toluene diisocyanate, chlorophenyl isocyanate, m-phenylene diisocyanate, b,b'-diphenylpropane-4,4'-diisocyanate, phenyl isocyanate, p-cetyl phenyl isocyanate, p-dodecylphenyl isocyanate, 3-nitro-4-dodecyl-phenyl isocyanate, 5-dodecyl-2-methyl phenyl isocyanate, p-cetyloxy-phenyl isocyanate, p-phenylene diisocyanate, naphthylene-1,4-diisocyanate, 1,3,5-benzene triisocyanate, tetrahydrofurfuryl isocyanate. All of these compounds may be prepared from their corresponding amines in the isocyanate position.

The process of this invention has consistently resulted in high yields, normally of 90% or better, and a product of extremely high purity which meets the specifications of consumers.

The aromatic isocyanates of this invention have utility as intermediates in the production of various active compounds useful as pharmaceuticals, insecticides and herbicides. Further, the di-aromatic isocyanates, and in particular toluene diisocyanate, have a wide variety of applications in the resin field, such as in the preparation of polyurethane resins. The aromatic isocyanates produced by the process of this invention thus have considerable utility.

While the foregoing is a description of the process of this invention, it is intended that the foregoing description or process of this invention be limited only by the hereinafter appended claims.

I claim:
1. The process which comprises:
   (a) reacting an aromatic primary amine wherein the amine groups are attached directly to an aromatic nucleus with a molar excess of a carbonyl halide selected from the group consisting of carbonyl chloride and carbonyl bromide in the presence of an aluminum halide catalyst selected from the group consisting of aluminum chloride and aluminum bromide and a liquid organic solvent for said aromatic amine to form a reaction product;
   (b) removing the gaseous hydrogen halide present from the reaction product while simultaneously adding a carbonyl halide selected from the group consisting of carbonyl chloride and carbonyl bromide to the reaction product; and
   (c) recovering an aromatic isocyanate wherein the isocyanate groups are attached directly to an aromatic nucleus.

2. The process of claim 1 wherein said solvent is an oxygen containing, liquid organic solvent.

3. The process which comprises:
   (a) reacting an aromatic primary amine wherein the amine groups are attached directly to an aromatic nucleus with a molar excess of a carbonyl halide selected from the group consisting of carbonyl chloride and carbonyl bromide in the presence of an aluminum halide catalyst selected from the group consisting of aluminum chloride and aluminum bromide and a liquid organic solvent for said aromatic amine at a temperature between about $-10°$ to $15°$ C. to form a reaction product;
   (b) removing the gaseous hydrogen halide present from the reaction product at a temperature less than about $80°$ C. while simultaneously adding a carbonyl halide selected from the group consisting of carbonyl chloride and carbonyl bromide to the reaction mixture; and
   (c) recovering an aromatic isocyanate wherein the isocyanate groups are attached directly to an aromatic nucleus.

4. The process of claim 3 wherein said solvent is an oxygen containing, liquid organic solvent.

5. The process of claim 3 wherein said catalyst is aluminum chloride and said carbonyl halide is carbonyl chloride, the mole ratio of aluminum chloride to carbonyl chloride being about 0.001 to 1.

6. The process of claim 3 wherein said solvent is ethyl acetate.

7. The process which comprises:
   (a) the mixing addition of a mixture of an aromatic primary amine wherein the amine groups are attached directly to the aromatic nucleus and a liquid organic solvent for said amine to a mixture of a liquid carbonyl halide selected from the group consisting of carbonyl chloride and carbonyl bromide and an aluminum halide catalyst selected from the group consisting of aluminum chloride and aluminum bromide in a first reaction chamber to form a first reaction product;
   (b) removing a portion of the first reaction product from the reaction chamber;
   (c) introducing said portion into a second reaction chamber containing a small amount of said organic solvent and maintained at a temperature of between $60–80°$ C. over a period of time to form a second reaction product while removing the gaseous hydrogen halide present in the second reaction product; and
   (d) recovering an aromatic isocyanate product wherein the isocyanate groups are attached directly to an aromatic nucleus from said second reaction product.

8. The process of claim 7 wherein a carbonyl halide selected from the group consisting of carbonyl chloride and carbonyl bromide is introduced into said second reaction chamber and into said portion.

9. The process of claim 8 wherein said carbonyl halide is phosgene, wherein said solvent is ethyl acetate and wherein said aluminum halide is aluminum chloride, the mole ratio of aluminum chloride to phosgene being about 0.001 to 1.

10. The process which comprises:
    (a) reacting a compound having the structural formula:

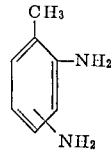

with a molar excess of phosgene in the presence of aluminum chloride, the mole ratio of aluminum chloride to phosgene being about 0.001 to 1, and ethyl acetate at a temperature of between about $-10°$ to about $15°$ C. to form a reaction product;
    (b) removing the gaseous hydrochloric acid present in the reaction product at an elevated temperature while simultaneously adding phosgene to the reaction product; and
    (c) recovering a compound having the structural formula:

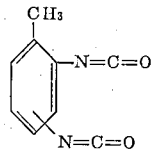

11. The process of claim 10 wherein step (b) is conducted at a temperature of less than about $80°$ C.

12. The process of claim 10 wherein step (c) is conducted by distillation to remove the ethyl acetate.

13. The process which comprises:
    (a) reacting an aromatic primary amine wherein the amine groups are attached to an aromatic nucleus hydrohalide with a carbonyl halide selected from the group consisting of carbonyl chloride and carbonyl bromide in the presence of an aluminum halide catalyst selected from the group consisting of aluminum chloride and aluminum bromide and a liquid organic solvent for said aromatic amine while removing the gaseous hydrogen halide present; and (b) recovering an aromatic isocyanate wherein the isocyanate groups are attached directly to an aromatic nucleus.

14. The process of claim 13 wherein step (a) is conducted at a temperature of less than 80° C.

15. The process of claim 13 wherein said solvent is ethyl acetate, wherein said catalyst is aluminum chloride and wherein said carbonyl halide is phosgene, the mole ratio of aluminum chloride to phosgene being about 0.001 to 1.

References Cited by the Examiner

UNITED STATES PATENTS 3,155,699 11/1964 Powers _____ 260—453

FOREIGN PATENTS 1,284,256 1/1962 France.

CHARLES B. PARKER, *Primary Examiner.*

S. H. LIEBERSTEIN, DALE R. MAHANAND,
*Assistant Examiners.*